A. J. NYE.
APPARATUS FOR TREATING FRUIT.
APPLICATION FILED APR. 11, 1913.
1,125,382.
Patented Jan. 19, 1915.
2 SHEETS—SHEET 2.
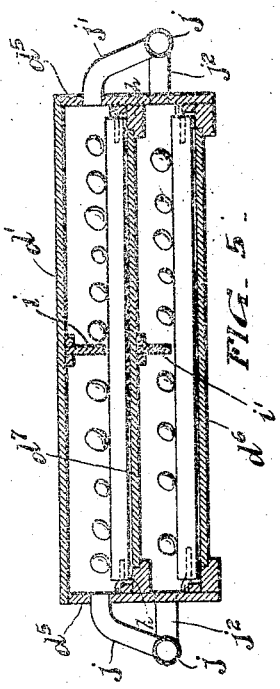
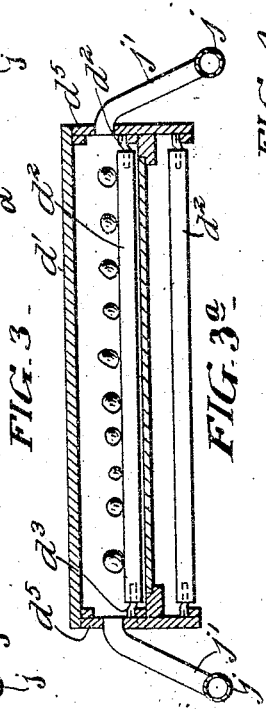
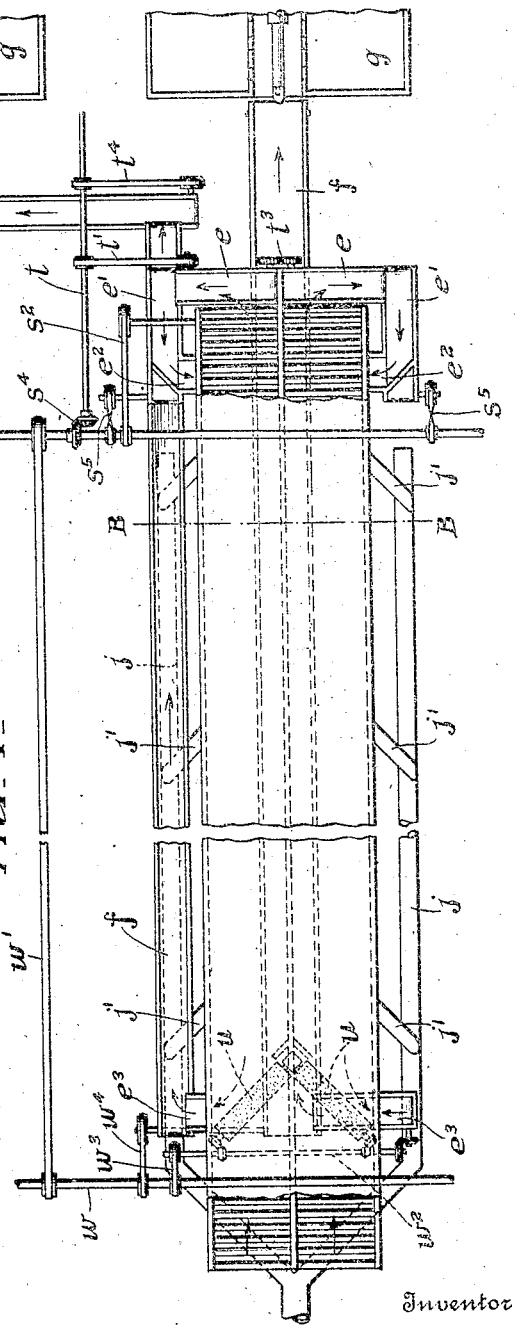
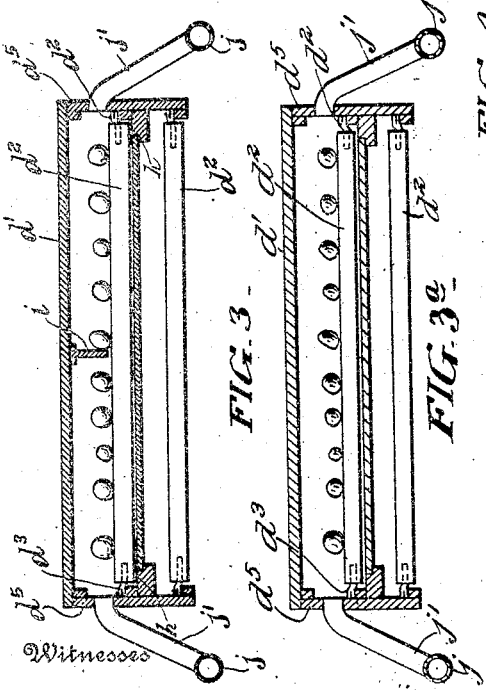

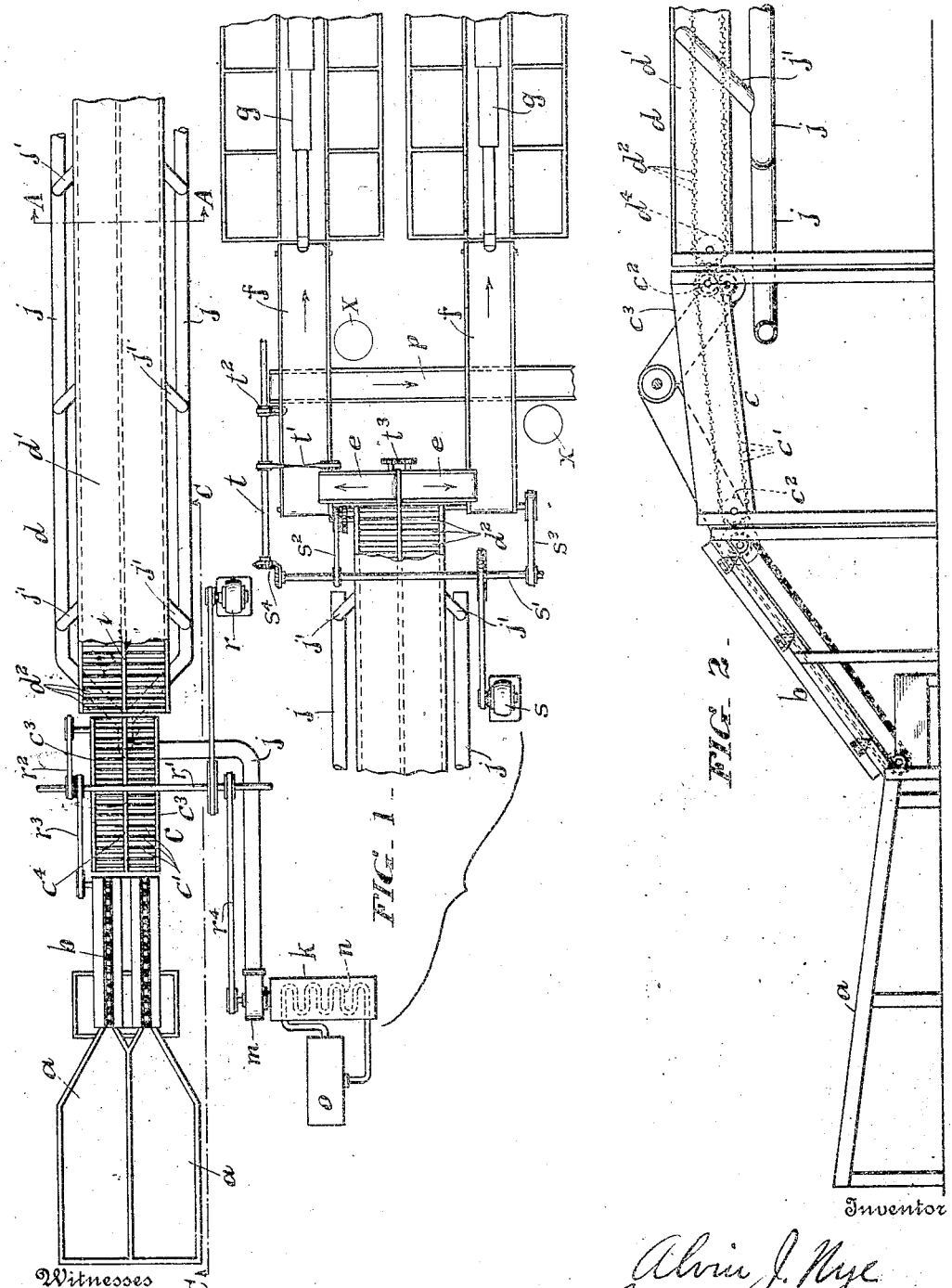

UNITED STATES PATENT OFFICE.

ALVIN J. NYE, OF ORLANDO, FLORIDA.

APPARATUS FOR TREATING FRUIT.

1,125,382.

Specification of Letters Patent.

Patented Jan. 19, 1915.

Application filed April 11, 1913. Serial No. 760,387.

*To all whom it may concern:*

Be it known that I, ALVIN J. NYE, citizen of the United States, and resident of Orlando, county of Orange, State of Florida, have invented an Improvement in Apparatus for Treating Fruit, of which the following is a specification.

My invention is intended particularly for treating citrus fruit, such as oranges, grape fruit, lemons, &c., and relates more especially to the means for thoroughly drying the fruit after it has passed through the washing devices and for delivering the washed and dried fruit to the sizers.

It is one of the objects of my invention to subject the fruit while moving through the drier to perfectly dry air and to eliminate as much as possible the presence of moisture or dampness.

It is also an object of the invention to enable the fruit to be treated with rapidity and to provide an apparatus effective for the purpose which will occupy a minimum amount of space in the packing house.

In the drawings: Figure 1 is a broken plan view of one form of the entire apparatus; Fig. 2 is a side elevation of a portion of the same on an enlarged scale with parts in section on the line C—C; Fig. 3 is an enlarged section on the line A—A of Fig. 1; Fig. 3ª is a view similar to Fig. 3 with the dividing partition omitted; Fig. 4 is a plan view of another form of the apparatus; and Fig. 5 is an enlarged section of the drier on the line B—B of Fig. 4.

In the drawings I have shown the apparatus of a double form adapted for simultaneously and separately treating fruit from two independent sources of supply, without intermingling of the fruit from one supply with that from the other. This enables fruit from different groves or from different consignees to be treated simultaneously in the apparatus. It is to be understood, however, that the apparatus may be of single form if desired, as is hereafter explained.

The fruit is fed over inclined feeding chutes $a$, $a$ to the elevating and washing devices $b$, $b$, to the traveling drip-rack $c$, from which it is delivered to the drier $d$. After passing through the drier the fruit is delivered to carriers $e$, $f$, $e$, $f$, by which it is conveyed to the sizers $g$, $g$, and automatically sorted according to size.

While the present invention is not limited to devices of any particular form for washing or cleaning the fruit before it is delivered to the drier, I prefer to use and have represented in the drawings the combined elevating and fruit cleaning devices shown in my Letters Patent 997,081 dated July 4, 1911, in which the fruit is carried between opposed sets of spring pressed brushes by an endless traveling chain also composed of brushes. After the fruit has been washed by the washing or cleaning devices, whether of the character shown in the patent referred to, or of other form, it passes to the drier. Instead of delivering the fruit to the drier directly, I prefer to interpose the drip-rack $c$, by which the fruit is received from the washing devices and delivered to the drier. This allows more or less of the water remaining on the fruit after it emerges from the washer to drip off, so that less work is imposed upon the drier. As shown, the drip-rack consists of an endless traveling carrier composed of wooden rollers journaled at their ends in traveling chains running over suitably driven sprocket wheels $c^2$. At the sides of the drip-rack are boards $c^3$, $c^3$ to retain the fruit, and when the apparatus is of the double form there is also a stationary center board $c^4$ fixed above the carrier to keep separate the fruit delivered by the different washers. The drier $d$ consists of a long inclosing casing $d'$, through which extends an endless traveling carrier composed of wooden rollers $d^2$ journaled at their ends in traveling chains $d^3$ running over suitably driven sprocket wheels $d^4$. The ends of the rollers $d^2$ while passing through the drier inclosure $d'$ run in frictional contact with longitudinal wooden strips $h$ and are rotated thereby so that the fruit is being constantly turned while in the drier. When the apparatus is of the double form there is a stationary longitudinal central partition $i$ carried by the casing and extending above the traveling carrier to prevent intermingling of the fruit. When the partition $i$ is omitted the apparatus will be of single form, as shown in Fig. 3ª. Dry air is introduced into the drier at intervals in its length through branch pipes $j'$ opening through the sides $d'$ of the casing above the carrier and leading from mains $j$. The air is drawn from a heater $k$ by a fan $m$ and forced into the mains $j$ and thence into the drier upon the traveling and rotating fruit. In the heater $k$ is a steam coil $n$ supplied with steam from the boiler $o$ or other source. The air entering the heater $k$ is atmospheric air and the pressure and temperature of the steam in the coil $n$ may be regulated to suit the humidity. As the air which acts upon the wet fruit absorbs the moisture it becomes more or less damp, and, if the air were introduced at or adjacent to the inlet of the drier only, the air would increase in dampness and decrease in absorptivity as it passed to the outlet. This is overcome by introducing the dry air through the branch pipes $j$ at intervals in the length of the drier. The result is that a perfect drying of the fruit may be accomplished with a drier of shorter length than would otherwise be possible.

In the apparatus shown in Figs. 1, 2 and 3 the dried fruit drops directly from the end of the drier-carrier upon the carriers $e, e,$ and from there it drops on the carriers $f, f,$ which carry it to the sizers $g, g,$ where it is sorted and packed for shipment.

$p$ is a carrier adjacent to the carriers $f, f,$ adapted to receive the "culls," or imperfect or second grade fruit, and carry it off to be separately packed. Operators standing as at $x, x$ pick out the culls from the carriers $f, f,$ and drop them upon the cull-carrier $p$.

Any convenient means may be used for driving the carriers, &c. I have shown a motor $r$ belted to a counter shaft $r'$ which by suitable belts and pulleys $r^2$, $r^3$ and $r^4$ drives the drip-rack $c$, washer $b$ and fan $m$. I have shown the carrier of the drier and the delivery carriers driven by a separate motor $s$ belted to a counter-shaft $s'$, which by suitable belts and pulleys $s^2$ and $s^3$ drives the carrier of the drier and the carriers $f, f$. The shaft $s'$ is connected by suitable gears $s^4$ with a shaft $t$, which is geared as at $t^2$ to the shaft of the cull carrier $p$ and connected by a suitable belt and pulleys $t'$ with the shaft of one of the short cross delivery belts $e$. The adjacent shafts of these belts are geared together as at $t^3$ so as to travel in opposite directions. It is to be understood, however, that the particular character or arrangement of the driving connections is immaterial to the invention, and that the driving devices may be arranged to suit the conditions of the building, arrangement of the apparatus and the ideas of the engineer.

In some cases it is inconvenient to build a drier of the full length necessary to effect a perfect drying of the fruit on the upper surface of the carrier. In such cases I utilize also the return or lower portion of the carrier for carrying the fruit, delivering it from the end of the upper portion of the carrier upon the lower portion which carries it back to the front where it is discharged upon delivery carriers which lead to the sizers. This arrangement permits the use of a drier approximately half as long as would otherwise be required. Such form of the apparatus is shown in Figs. 4 and 5. The bottom of the casing $d'$ is closed by a floor $d^5$, so that the drier casing is divided into two compartments, in the upper of which the upper or forwardly moving portion of the carrier travels, as in Fig. 3, while the lower or returning portion moves in the lower compartment. What was, in the former case the bottom of the drier inclosure is now a dividing partition $d^5$, and when the drier is of the double form this may be provided with a longitudinal partition $i'$ similar to the partition $i$. Branches $j^2$ from the mains $j$ open at intervals into the lower partition. At the front end of the carrier of the drier are the belts $e, e,$ as in the construction shown in Fig. 1, but these, instead of delivering the fruit to carriers leading to the sizers, deliver it to short carriers $e', e',$ which by means of suitable guides $e^2, e^2,$ deliver the fruit into the space between the two portions of the drier carrier on the surface of the lower portion, by which it is carried forward through the lower compartment of the drier and subjected to the dry air introduced through the branch pipes $j^2$. Near the front of the drier, above the lower portion of the carrier are rotating brushes $u, u,$ arranged at an angle, as shown in Fig. 4; these act to push the fruit from the surface of the lower portion of the carrier out upon the short carriers $e^3, e^3,$ by which it is delivered to the carriers $f, f,$ which deliver it to the sizers. In this arrangement I have shown one of the delivery carriers $f$ extending under the drier, while the other delivers the fruit to the sizer not directly but through the medium of intermediate carriers $f', f^2$. The course of the fruit in this form of the apparatus and with this arrangement of delivery carriers is indicated by the arrows in Fig. 4. It will be understood that where the drier is of the single form without an intermediate partition, but one angularly arranged brush would be used. I prefer to use rotating brushes for the purpose of expelling the fruit, because they will not bruise it, but obviously any angularly arranged barrier placed in the same position will accomplish the result. In this form of the apparatus I have shown the counter-shaft $s'$ connected by the belt $s^2$ with the driving shaft of the drier-carrier, and also by the gears $s^4$ with the counter-shaft $t$ which is connected by the belt $t'$ with the shaft of one of the short transverse carriers $e$ as in the arrangement of the apparatus shown in Fig. 1. The short carriers $e', e'$ are also driven from the shaft $s'$ by suitable belts $s^5, s^5$. Near the front of the drier is a counter-shaft $w$ driven through a suitable belt and pulleys $w'$ from the shaft $s'$. The brushes $u, u,$ are driven through suitable gears from a shaft $w^2$ driven by a belt $w^3$ from the countershaft $w$. The carriers $f'$ and $f^2$ respectively are driven by suitable belts $s^6$ and $t^4$ from the shafts $s'$ and $t$. The carrier $f$ is driven by a belt $w^4$ from the shaft $w$. As has been stated with regard to the apparatus shown in Fig. 1 the arrangement of the driving devices and the delivery carriers may be varied without affecting the invention. I do not claim the process of treating citrus fruit described herein or any part thereof separate from the apparatus, as the same forms the subject matter of my application Ser. No. 828,757, filed April 1, 1914.

What I claim is as follows:

1. In apparatus for treating fruit, the combination of a drier comprising an inclosing casing and a traveling carrier passing through said casing, an elevator for lifting the fruit to the level of the traveling carrier in the drier, and a traveling driprack extending between the top of the elevator and the traveling carrier.

2. In apparatus for treating fruit, the combination of a drier comprising an inclosing casing and a traveling carrier passing through said casing, a combined washing and elevating apparatus for washing the fruit and lifting it to the level of the traveling carrier in the drier, and a traveling drip-rack extending between the top of the washing and elevating apparatus and the traveling carrier.

3. In apparatus for treating fruit, a drier consisting of an inclosing casing open at its ends, a traveling carrier passing through said casing, and a partition extending longitudinally over the surface of said carrier to separate the fruit on opposite sides thereof while passing through the drier, and independent traveling carriers for receiving and conveying the fruit from the opposite sides of said partition when the fruit is discharged from the drier.

4. In apparatus for treating fruit, the combination of a drier consisting of an inclosing casing open at its ends, an endless traveling carrier moving through said casing, and means consisting of traveling carriers for transferring the fruit discharged from the upper surface of the upper portion of said carrier to the upper surface of the lower portion thereof.

5. In apparatus for treating fruit, the combination of a drier consisting of an inclosing casing open at its ends, an endless traveling carrier moving through said casing, and means for transferring the fruit discharged from the upper surface of the upper portion of said carrier to the upper surface of the lower portion thereof, and means adjacent to the front of said traveling carrier and above the lower portion thereof for expelling the fruit from said lower portion.

6. In apparatus for treating fruit, the combination of a drier consisting of an inclosing casing open at its ends, an endless traveling carrier moving through said casing, means for transferring the fruit discharged from the upper surface of the upper portion of said carrier to the upper surface of the lower portion thereof, and means consisting of an angularly arranged barrier adjacent to the front of said traveling carrier and above the lower portion thereof for expelling the fruit from said lower portion.

7. In apparatus for treating fruit, the combination of a drier consisting of an inclosing casing open at its ends, an endless traveling carrier moving through said casing, means for transferring the fruit discharged from the upper surface of the upper portion of said carrier to the upper surface of the lower portion thereof, and means consisting of an angularly arranged rotating brush adjacent to the front of said traveling carrier and above the lower portion thereof for expelling the fruit from said lower portion.

8. In apparatus for treating fruit, the combination of a drier, consisting of an endless traveling carrier, and a casing open at both ends and entirely inclosing said carrier, an air pipe extending along said casing and branches leading from said air pipe into the casing at intervals in its length above both the upper and lower portions of the endless carrier.

9. In apparatus for treating fruit, the combination of a drier, consisting of an endless traveling carrier, and a casing open at both ends and entirely inclosing said carrier, an air pipe extending along said casing and branches leading from said air pipe into the casing at intervals in its length above both the upper and lower portions of the endless carrier, an air heater, a steam coil in said heater and a fan connected with the heater for forcing dry air into said pipe.

10. In apparatus for treating fruit, the combination of a drier, consisting of an inclosing casing divided by a horizontal partition into two compartments, and an endless traveling carrier moving forward through one compartment and returning through the other, and means for transferring the fruit discharged from the upper surface of the upper portion of said carrier to the upper surface of the lower portion thereof in the lower compartment.

11. In apparatus for treating fruit, the combination of a drier, consisting of an inclosing casing divided by a horizontal partition into two compartments, and an endless traveling carrier moving forward through one compartment and returning through the other, means for transferring the fruit discharged from the upper surface of the upper portion of said carrier to the upper surface of the lower portion thereof in the lower compartment, and means for introducing dry air at intervals in the length of said casing into both the upper and lower compartments.

12. In apparatus for treating fruit, the combination of a drier, consisting of an inclosing casing divided by a horizontal partition into two compartments, and an endless traveling carrier moving forward through one compartment and returning through the other, and means for transferring the fruit discharged from the upper surface of the upper portion of the lower portion thereof in the lower compartment, longitudinal partitions carried by the top of the casing and the horizontal partition for separating the fruit on the carrier.

13. In apparatus for treating fruit, the combination of a drier, consisting of an inclosing casing divided by a horizontal partition into two compartments, and an endless traveling carrier moving forward through one compartment and returning through the other, means for transferring the fruit discharged from the upper surface of the upper portion of said carrier to the upper surface of the lower portion thereof in the lower compartment, longitudinal partitions carried by the top of the casing and the horizontal partition for separating the fruit on the carrier, and means adjacent to the front of the drier-casing for expelling the fruit from the upper surface of the lower portion of said carrier on each side of the longitudinal partition.

14. In apparatus for treating fruit, the combination of a drier, consisting of an inclosing casing divided by a horizontal partition into two compartments, and an endless traveling carrier moving forward through one compartment and returning through the other, means for transferring the fruit discharged from the upper surface of the upper portion of said carrier to the upper surface of the lower portion thereof in the lower compartment, longitudinal partitions carried by the top of the casing and the horizontal partition for separating the fruit on the carrier, and means adjacent to the front of the drier-casing for expelling the fruit from the upper surface of the lower portion of said carrier on each side of the longitudinal partition consisting of angularly arranged barriers.

15. In apparatus for treating fruit, the combination of a drier, consisting of an inclosing casing divided by a horizontal partition into two compartments, and an endless traveling carrier moving forward through one compartment and returning through the other, means for transferring the fruit discharged from the upper surface of the upper portion of said carrier to the upper surface of the lower portion thereof in the lower compartment, longitudinal partitions carried by the top of the casing and the horizontal partition for separating the fruit on the carrier, and means adjacent to the front of the drier-casing for expelling the fruit from the upper surface of the lower portion of said carrier on each side of the longitudinal partition consisting of angularly arranged rotating brushes.

16. In apparatus for treating fruit, the combination of a drier, consisting of an inclosing casing divided by a horizontal partition into two compartments, and an endless traveling carrier moving forward through one compartment and returning through the other, means for transferring the fruit discharged from the upper surface of the upper portion of said carrier to the upper surface of the lower portion thereof in the lower compartment, longitudinal partitions carried by the top of the casing and the horizontal partition for separating the fruit on the carrier, and means adjacent to the front of the drier-casing for expelling the fruit from the upper surface of the lower portion of said carrier on each side of the longitudinal partition, and independent carriers for conveying the fruit expelled from the opposite sides of said drier.

17. In apparatus for treating fruit, the combination of a drying inclosure, a traveling carrier passing through said inclosure, a plurality of independent sizers, and a plurality of independent traveling carriers leading from the discharge end of said carrier which passes through the inclosure.

18. In apparatus for treating fruit, the combination of washing devices, a drier comprising an inclosing casing and a system comprising an inclosing casing and a substantially horizontal traveling carrier passing through said casing, and a substantially horizontal traveling drip-rack between the washing devices and drier.

19. In apparatus for treating fruit, the combination with a drier comprising an inclosing casing and a traveling carrier passing through said casing, of a traveling drip rack for conveying washed fruit to the carrier of the drier, and means for rotating the fruit while it is being carried on the drip rack.

20. In apparatus for treating fruit, the combination with a drier comprising an inclosing casing and a traveling carrier passing through said casing, of a traveling drip rack for carrying washed fruit to the carrier of the drier consisting of rotating rollers adapted to rotate the fruit while it is being carried to the drier.

21. In apparatus for treating fruit, the combination with a drier comprising an inclosing casing and a traveling carrier passing through said casing, of a traveling drip rack for conveying washed fruit to the drier, consisting of an endless traveling carrier composed of transverse rotating rollers.

In testimony of which invention, I hereunto set my hand.

ALVIN J. NYE.

Witnesses:
C. B. ROBINSON,
A. E. McDONALD.